(12) United States Patent
Korte

(10) Patent No.: US 6,430,874 B1
(45) Date of Patent: Aug. 13, 2002

(54) DEVICE FOR GUIDING AND SEALING A MOVEABLE WINDOW

(75) Inventor: Hans-Bernd Korte, Hanover (DE)

(73) Assignee: Metzeler Automotive Profiles, GmbH, Lindau (DE)

( * ) Notice: Subject to any disclaimer, the term of this patent is extended or adjusted under 35 U.S.C. 154(b) by 0 days.

(21) Appl. No.: 09/720,559
(22) PCT Filed: Oct. 7, 1999
(86) PCT No.: PCT/EP99/07536
§ 371 (c)(1), (2), (4) Date: Dec. 21, 2000
(87) PCT Pub. No.: WO00/22269
PCT Pub. Date: Apr. 20, 2000

(30) Foreign Application Priority Data

Oct. 9, 1998 (DE) .................................. 198 46 658

(51) Int. Cl.⁷ .............................................. E05F 11/00
(52) U.S. Cl. ............................ 49/358; 49/362; 49/441
(58) Field of Search .......................... 49/348, 349, 337, 49/358, 362, 441

(56) References Cited

U.S. PATENT DOCUMENTS

| | | | |
|---|---|---|---|
| 2,336,530 A | * 12/1943 | Chandler et al. | |
| 2,365,454 A | * 12/1944 | Chandler et al. | |
| 4,167,834 A | * 9/1979 | Pickles | 49/358 |
| 4,170,847 A | * 10/1979 | Pickles | 49/349 |
| 4,939,867 A | * 7/1990 | Harada et al. | 49/349 |
| 4,967,510 A | * 11/1990 | Torii et al. | 49/358 |
| 4,979,261 A | * 12/1990 | Lasier et al. | 16/62 |
| 5,265,377 A | * 11/1993 | Iwasa et al. | 49/441 |
| 5,414,961 A | * 5/1995 | Tessier | |
| 5,537,782 A | * 7/1996 | Klippert et al | 49/358 |
| 6,108,976 A | * 8/2000 | Kato et al. | 49/360 |
| 6,145,252 A | * 11/2000 | Fenelon | 49/349 |
| 6,216,394 B1 | * 4/2001 | Fenelon | 49/349 |

* cited by examiner

Primary Examiner—Curtis A. Cohen
(74) Attorney, Agent, or Firm—Stephen B. Salai, Esq.; Brian B. Shaw, Esq.; Harter, Secrest & Emery LLP

(57) ABSTRACT

The present invention relates to device (50) for guiding and sealing a moveable window (10), especially a side window of a motor vehicle. The device (50) includes at least one guide rail (15, 16) which comprises an inner space for guiding lateral edges (11, 12) of the window (10) and has sealing elements for sealing the window (10). The device comprises at least one driving means (17, 18, 19; 20, 21, 22) for moving the window (10) and which interacts with the guide rail (15, 16).

18 Claims, 3 Drawing Sheets

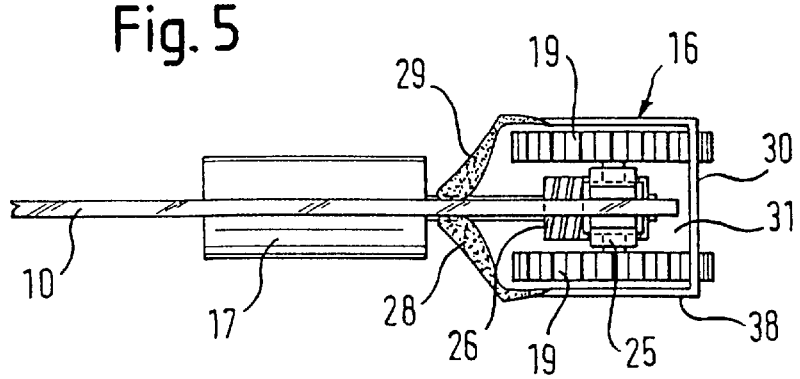
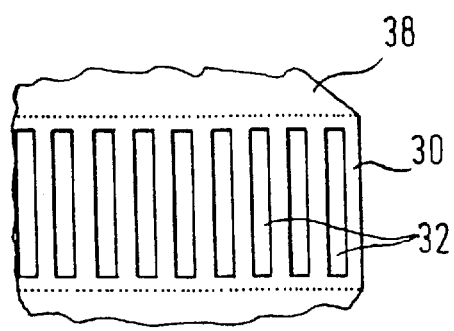
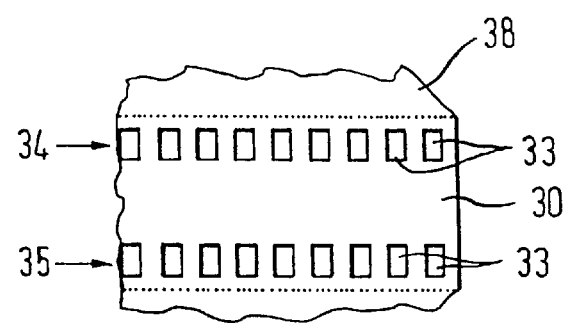
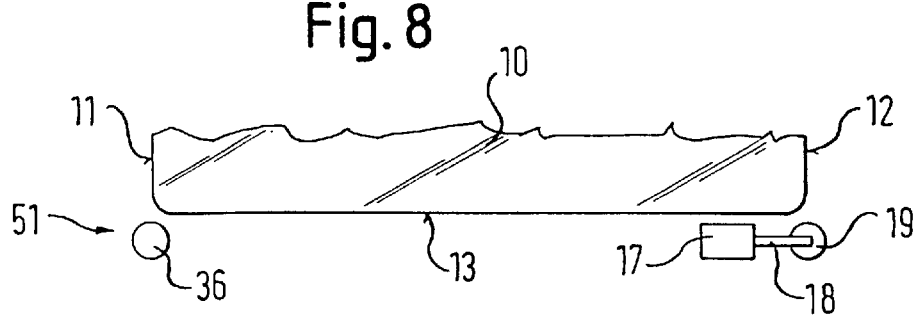
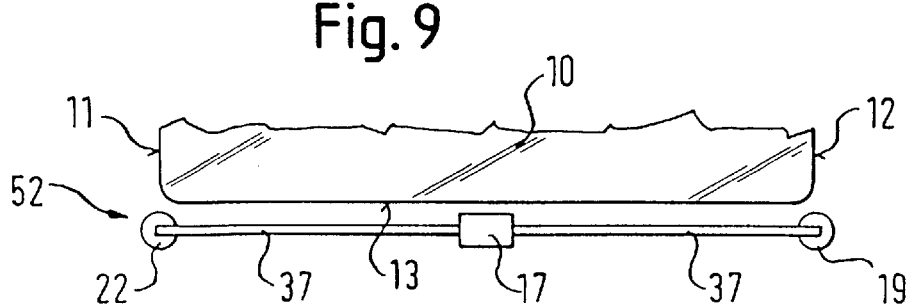

DEVICE FOR GUIDING AND SEALING A MOVEABLE WINDOW

BACKGROUND OF THE INVENTION

Field of the Invention

The invention relates to a device for guiding and sealing a moveable window, especially a side window of a motor vehicle, including at least one guide rail which comprises an inner space for guiding lateral edges of the window and has sealing elements for sealing the window.

One such device is known from German patent DE 44 35 088 A1 assigned to the same applicant. The guide rail of the known device comprises an inner space serving to guide the sealing edges of the moveable window. The guide rail is furthermore provided with sealing elements for sealing the window. For moving the window up and down an additional engine is provided.

The disadvantage in this known device is that raising or lowering the window can only be achieved by an additional engine. This engine is fabricated and fitted separately thus substantially adding to the expense in production and assembly. In addition the number of components used adds to the overall weight. The space required for installation is relatively large so that little room remains available for other assemblies.

It is thus the objective of the present invention to provide a device for guiding and sealing a moveable window which permits movement of the window by a simple lightweight and compact design.

BRIEF DESCRIPTION OF THE INVENTION

In accordance with the invention this objective is achieved for a device of the aforementioned kind in that the device comprises at least one driving means for moving the window which interacts with the guide rail.

The guide rail thus serves not only for guiding and sealing the window, but also for moving it, i.e. an additional engine for movement of the window needing to be produced and fitted separately is no longer required. This thus significantly reduces the number of the components whilst in addition achieving a simple, lightweight and compact design.

The driving means and the guide rail may interact by positive or friction contact. Positive contact may be attained by a driven gearwheel of the driving means engaging assigned protuberances or perforations in the guide rail. Such gearwheels are readily available in a variety of differing shapes and sizes so that optimum adaptation to differing boundary conditions, more particularly as regards the size and weight of the window to be moved and the required closing speed is possible. In friction contact interaction a driven friction wheel is urged against an assigned surface area of the guide rail. As an alternative the driving means may comprise a linear motor.

Advantageous aspects and further embodiments of the invention read from the dependent claims.

To advantage each driving means comprises an electric motor driving at least one driving element cooperating with the guide rail. Despite its small size and low weight the electric motor furnishes a sufficient torque for driving the driving element.

In one advantageous aspect the guide rail comprises a supporting portion arranged in the inner space cooperating with the driving element. The outer sides of the guide rail remain smooth with no change to thus achieve a pleasing appearance whilst simultaneously permitting a compact configuration. The supporting portion is configured sufficiently stiff whilst the other portions of the guide rail may be configured less stiff and lightweight.

In accordance with one advantageous further embodiment the supporting portion is configured in the form of perforations in an upright of the guide rail which are engaged by at least one driving element. The driving element is advantageously configured as a gearwheel. The upright provides sufficient stiffness for the guide rail and serves at the same time as a supporting portion for moving the window. Stamping out the perforations is a speedy procedure. As an alternative the upright may be provided with protuberances in the form of reliefs. There is no need to produce a separate component for subsequent connection to the guide rail.

To advantage the upright is made of metal, more particularly of aluminum or of a plastics material to thus achieve high strength for a low overall weight.

In accordance with another advantageous configuration the upright comprises a substantially U-shaped cross-section and defines the inner space of the guide rail. This cross-section of the upright is simple to produce, rugged and low in overall weight.

In one advantageous further embodiment the sealing elements are extruded on the upright which can thus produced independently of the sealing elements depending on the boundary conditions in each case.

To advantage the at least one driving element is secured to the window. The supporting portion as a relatively large component is configured fixed, whilst the small and relatively lightweight electric motor and the driving element are moved together with the window. This thus results in an overall reduction in the mass of the moved components.

In accordance with another advantageous further embodiment the inner space of the guide rail is suitable to accommodate the driving element. The driving element thus runs protected from soilage directly in the inner space, thus furthermore achieving a compact configuration.

In yet another advantageous further embodiment the inner space of the guide rail is suitable to accommodate the driving element and the electric motor so that then all components needed to move the window can be arranged in the inner space where they are protected from soilage.

In accordance with a first advantageous aspect each guided lateral edge of the moveable window is assigned at least one driving element. The window is thus driven on both sides in the region of the guided lateral edges to thus preclude any tilting of the window.

In another advantageous further embodiment each guided lateral edge is assigned an electric motor. The sealing edges are moved simultaneously by the electric motors being synchronized to thus preclude any tilting of the window.

In yet another advantageous further embodiment an electric motor is provided which acts on the driving elements at the guided lateral edges, i.e. eliminating any need for synchronizing several electric motors whilst reducing the number of components needed and the weight overall.

In accordance with a second advantageous aspect one guided lateral edge is assigned at least one driving element driven by an electric motor and the other guided lateral edge is assigned a supporting mount for support.

Depending on the boundary conditions the window is driven only by one lateral edge whilst the other lateral edge is supported by a suitable supporting mount. This design enables one of the electric motors to be eliminated without a connection being needed between the guided lateral edges of the window.

Advantageously the supporting mount is accommodated in the inner space of the guide rail, this not only achieving a compact design but also providing protection of the sealing elements from soilage.

In still another advantageous further embodiment the driving elements are arranged on the guided lateral edges of the window paired spaced away from each other paired, the window being arranged centered relative to the driving elements. Arranging the driving elements on both sides of the window prevents the window from tilting and ensures reliably up and down movement.

In accordance with yet another advantageous aspect each electric motor acts via a self-locking gear, more particularly a worm gear on the assigned driving element(s) so that any movement of the window is only possible by powering the motor. This thus reliably prevents the window from being shifted out of place by forces acting from without. No additional component, more particularly a separate brake is needed for this purpose, but may be provided as an alternative or in addition thereto.

BRIEF DESCRIPTION OF THE DRAWINGS

The invention will now be detailed by way of example embodiments illustrated schematically in the drawing in which:

FIG. 5 is a view from above as shown in FIG. 2;

FIG. 6 is a schematic view of an upright 38 including perforations;

FIG. 7 is a view similar to that of FIG. 6 in a further embodiment of the perforations;

FIG. 8 is a view similar to that of FIG. 1 in a second embodiment;

FIG. 9 is a view similar to that of FIG. 1 in a third embodiment;

DETAILED DESCRIPTION OF THE INVENTION

Figure 1:
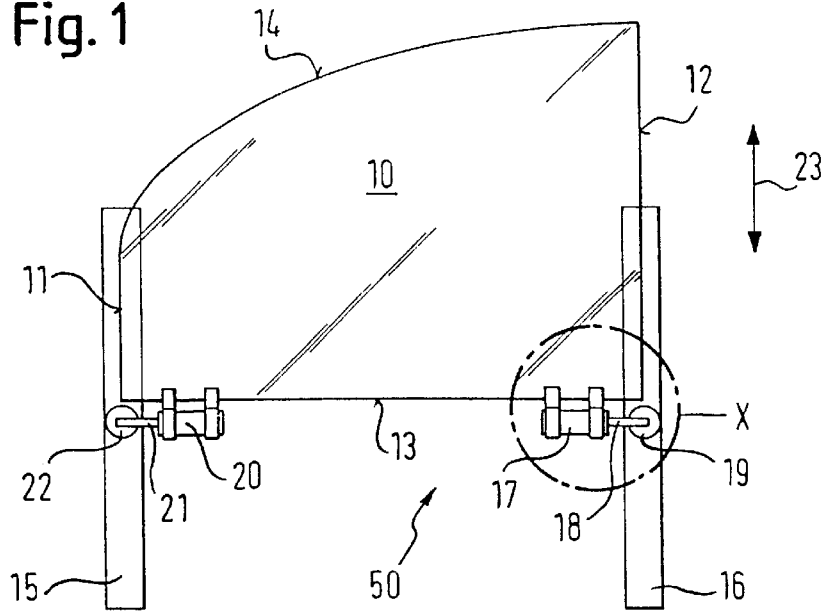
FIG. 1 is a schematic view of the device in accordance with the invention in a first embodiment.

Referring now to FIG. 1 there is illustrated a schematic view of the device 50 in accordance with the invention in a further embodiment. A window 10 having lateral edges 11, 12 of a lower edge 13 and an upper edge 14 is guided along the lateral edges 11, 12 in guide rails 15, 16. The window 10 is moveable in the direction of the arrow 23. Secured in the vicinity of the right-hand lateral edge 12 at the lower edge 13 of the window 10 is an electric motor 17 which acts via a shaft 18 on a driving element 19 which is rotatably secured to the window 10. Likewise provided at the opposite lateral edge 11 are an electric motor 20, a shaft 21 and a driving element 22. Each of the electric motors 17, 20, the shafts 18, 21 and the driving elements 19, 22 forms a driving means.

The guide rails 15, 16 and the driving means 17, 18, 19 and 20, 21, 22 are part of the device 50 for guiding, sealing and moving the window 10.

Figure 2:
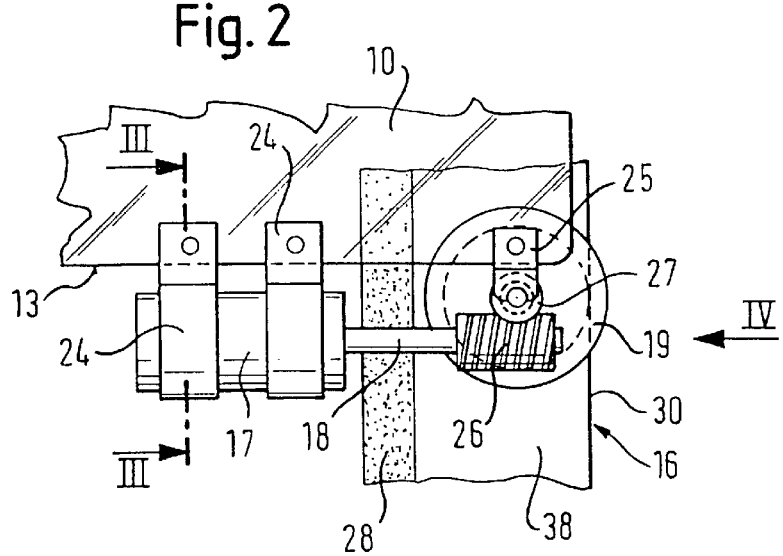
FIG. 2 is a magnified view of a detail "X" taken from FIG. 1 in the further embodiment.

Referring now to FIG. 2 there is illustrated a magnified view of a detail "X" taken from FIG. 1. The electric motor 17 and the driving element 19 are secured by means of supporting fixtures 24, 25 to the lower edge 13 of the window 10. The shaft 18 is provided in its portion facing away from the electric motor 17 with a worm shaft 26. This worm shaft 26 mates with a worm gear 27 that is connected to the driving element 19. The driving element 19 is totally accommodated in the guide rail 16. Illustrated schematically is how the driving element 19 is configured as a gearwheel mating with a supporting portion 30 of the guide rail 16. As soon as the electric motor 17 is set in motion, the worm shaft 26 and the worm gear 27 produce a rotation of the driving element 19 via the shaft 18. The driving element 19 cooperates with the supporting portion 30 integrated in the guide rail 16, as a result of which the window 10 is moved in the direction of the arrow 23.

The worm shaft 26 and the worm gear 27 are configured as a self-locking gear. Any displacement of the window 10 when the electric motor 17 is OFF is rendered impossible by the high step-down in gear ratio between the worm shaft 26 and the worm gear 27. The window 10 is thus reliably arrested at the required level without the need of any further aid when the electric motor 17 is OFF.

Figure 3:
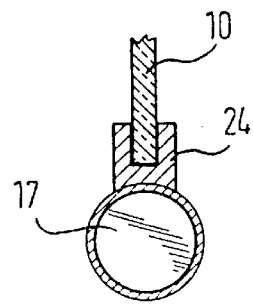
FIG. 3 is a section taken along the line III—III as shown in FIG. 2.
Figure 4:
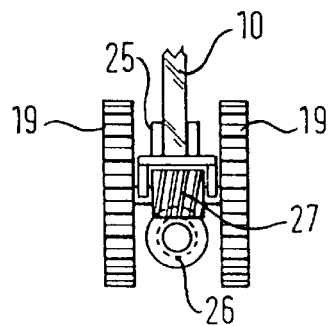
FIG. 4 is a view in the direction of the arrow IV as shown in FIG. 2.

Referring now to FIGS. 3 and 4, details of how the electric motor 17 and the driving element 19 are secured to the window 10 are evident. The window 10 is clasped on both sides by the supporting fixtures 24, 25 and arranged roughly centered. Likewise evident is how two driving elements 19 are provided arranged spaced away from and parallel to each other in pairs. The window 10 is arranged substantially in the middle of the driving elements 19. This centered arrangement counteracts an lateral tilting of the window 10. At the same time the necessary overall height is reduced since the driving elements 19 may be caused to clasp the window 10 portionwise. This is evident schematically from FIGS. 2 and 4.

Referring now to FIG. 5 there is illustrated a view from above of FIG. 2 in which it is evident that the guide rail 16 comprises an upright 38 which is configured cross-sectionally substantially U-shaped. The upright 38 may be made of metal, more particularly of aluminum or of a plastics material in defining an inner space 31 of the guide rail 16. Accommodated in the inner space 31 are driving elements 19, worm shaft 26 and worm gear 27 as well as mounting fixture 25 for securing to the window 10. It is to be noted that to simplify the illustration the supporting fixture 24 for securing the electric motor 17 is not shown in FIG. 5. The supporting portion 30 is arranged at the inner side of the upright 38 assigned to the driving elements 19 in the inner space 31.

For sealing, sealing elements 28, 29 extruded to the upright 38 serve by sealingly contacting the window 10. The interspace between the sealing elements 28, 29 is not only accessed by the window 10 but also by the shaft 18. The thickness of the shaft 18 thus corresponds substantially to the thickness of the window 10 or is only slightly more, thus resulting in a reliable sealing contact of the sealing elements 28, 29 and the window 10.

Referring now to FIG. 6 there is illustrated schematically the upright 38 with the supporting portion 30. Provided in the supporting portion 30 are several perforations 32 arranged parallel to each other. The perforations 32 extend substantially over the full width of the supporting portion 30 defined by the dotted lines.

Referring now to FIG. 7 there is illustrated another aspect of the perforations 33. These perforations 33 are arranged in two rows 34, 35 oriented in parallel. In the middle the supporting portion 30 is free of perforations so that a higher stability is achieved.

As indicated in the FIGS. 2 and 5 the driving elements 19 mate by teeth (not shown) in the perforations 32 or perforations 33. The protruding portion of the driving elements 19 as shown in FIGS. 2 and 5 is a schematic representation of how this mating occurs, it being obvious that the teeth of the driving elements 19 and the perforations 32, 33 are matched in location and size.

To move the window 10 in the direction of the arrow 23 the electric motors 17, 20 are set in motion at the same time, they being synchronized such that any movement of the window 10 is achieved without tilting. The rotation of the electric motors 17, 20 is transmitted via the shafts 18, 21 and the worm gears 26, 27 to the driving elements 19, 22. These driving elements 19, 22 cooperate with the supporting portion 30 in the guide rails 15, 16. Rotation of the driving elements 19, 22 results in the window 10 and the electric motors 17, 20, the shafts 18, 21 of the driving elements 19, 22 and the worm gears 26, 27 being shifted in the direction of the arrow 23. Depending on the direction of rotation of the electric motors 17, 20 the window 10 is moved up or down. When the electric motors 17, 20 are OFF the self-locking worm gears 26, 27 prevent any unwanted movement of the window 10. During movement and also when stationary the window 10 is reliably guided along the guide rails 15, 16 by the sealing elements 28, 29, these simultaneously achieving the desired sealing effect.

In this arrangement the length of the guide rails 15, 16 is selected somewhat more than the overall height of the window 10 together with the electric motors 17, 20 and the driving elements 19, 22 secured thereto. This is illustrated, for example, in FIG. 1. If the window 10 is not to be moved fully down, the length of the guide rails 15, 16 may also be shortened. The device 50 is inserted preferably in the door cavity of an automobile, it then being concealed from without. For further guiding and sealing the window 10 in the region of the window cutout of the vehicle door further guide rails (not shown) may be provided.

Referring now to FIG. 8 there is illustrated a further embodiment of a device 51 in accordance with the invention for guiding sealing and moving a window 10. In this device 51 a motor 17, shaft 18 and a driving element 19 are provided only on the right-hand lateral edge 12 of the window 10. Provided at the lateral edges 11 guided on the opposite side is a supporting mount 36 for support. It is good practice when the supporting mount 36 is likewise accommodated in the inner space 31 of the guide rails 15 as illustrated schematically in FIG. 1 as regards the driving element 22. In this arrangement the supporting mount 36 may be configured like the driving elements 19, 22 and secured to the window 10.

Referring now to FIG. 9 there is illustrated a further embodiment of a device 52 in accordance with the invention. In this device 52 an electric motor 17 is provided mounted roughly in the middle of the lower edge 13 of the window 10. Both lateral edges 11, 12 of the window 10 are assigned driving elements 19, 22 driven via shafts 37 by the electric motor 17. In this arrangement the driving elements 19, 22—as evident from FIGS. 1 and 5—are accommodated in the inner space 31 of the guide rails 15, 16 and cooperate with the supporting portion 30 to move the window 10.

Figure 10:
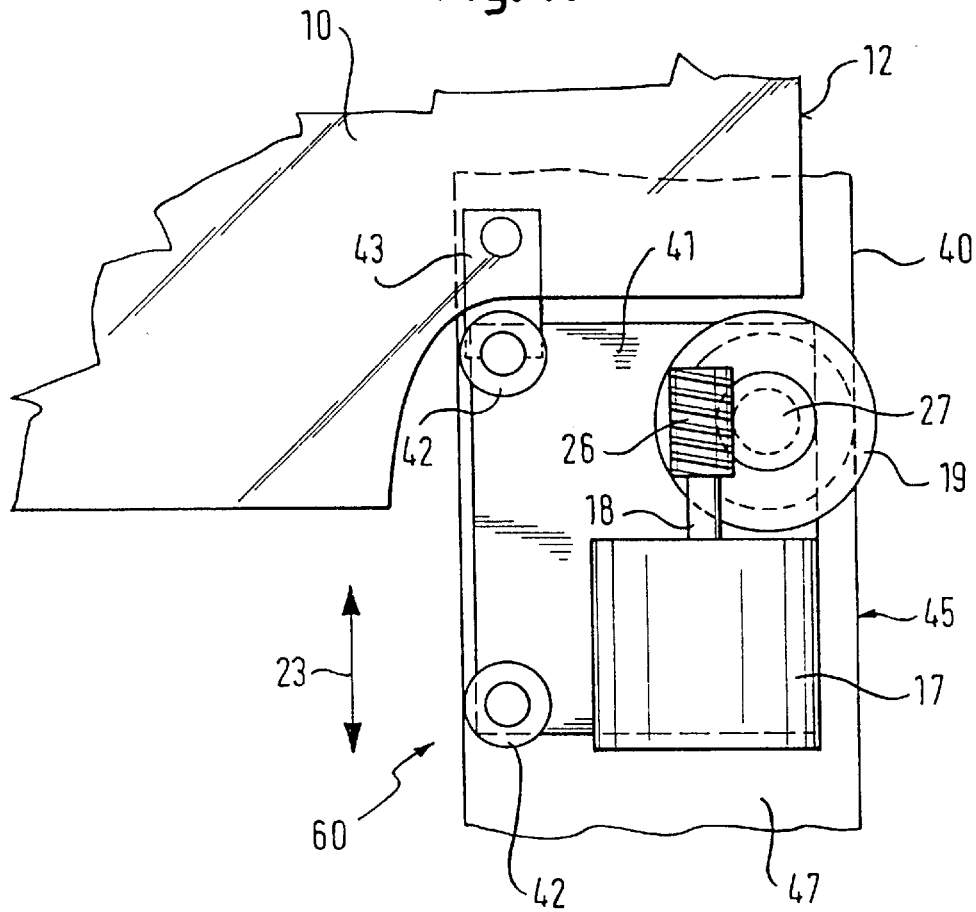
FIG. 10 is a magnified view of a detail "X" taken from FIG. 1 in a fourth embodiment.
Figure 11:
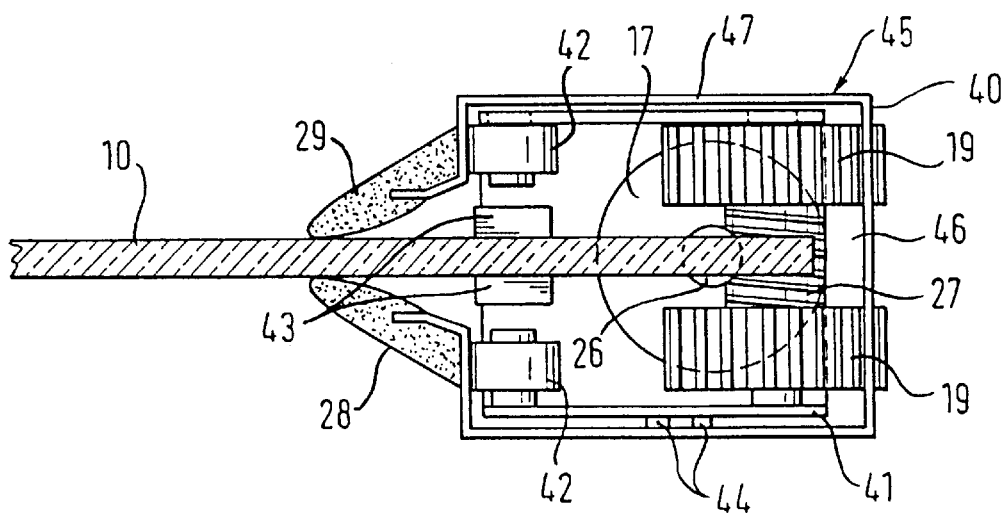
FIG. 11 is a view from above on the embodiment of FIG. 10.

Referring now to FIGS. 10 and 11 there is illustrated a further embodiment of a device 60 in accordance with the invention in which the electric motor 17 together with the shaft 18 and the worm shaft 26 as well as the driving elements 19 are accommodated in a carriage 41. The driving elements 19 are rotatably mounted on the carriage 41. The carriage 41 comprises supporting rollers 42, is accommodated in an inner space 46 of a guide rail 45 and secured by an mounting fixture 43 to the window 10. At the side facing the middle of the window 10 the carriage 41 is supported by its supporting rollers 42 on an upright 47 of the guide rail 45. Support is provided at the opposite side by the driving elements 19 which are in turn configured as gearwheels. In this arrangement a supporting portion 40 of the upright 47 comprises perforations corresponding to the perforations 32, 33 as shown in FIGS. 6 or 7. The upright 47 comprises further sealing elements 28, 29 extruded in place which sealingly contact the window 10.

A carriage 41 including a further electric motor and further driving elements 19 may be provided configured mirror-inverse at the opposite lateral edges 11 of the window 10. As an alternative use may be made in this case of a supporting mount 36.

To move the window 10 in the direction of the arrow 23 the electric motor 17 is set in motion, it acting via the shaft 18 and the worm shaft 26 via the worm gear 27 illustrated schematically on the driving elements 19. The driving elements 19 engage the perforations 32 or 33 of the supporting portion 40 at the upright 47 and move the window 10. When the electric motor 17 is signalled OFF the worm gears 26, 27 in turn reliably result in the window 10 being arrested.

The embodiment as shown in FIGS. 10 and 11 permits total accommodation of the electric motor 17 and driving elements 19 in the inner space 46 of the guide rail 45. The power supply to the electric motor 17 is made via conductor paths 44 which are likewise accommodated in the inner space 46. In the inner space 46 the electric motor 17, shaft 18 and conductor paths 44 are protected from soilage and damage. The complete area involving movement of the window 10 is free of any power supply cables for the electric motor 17. The complete device 60 is integrated in the guide rail 45 and a further guide rail configured mirror-inverse opposingly.

All embodiments of the invention permit eliminating the need of an additional engine to move the window 10. Instead the means for moving the window 10 are achieved by the driving elements 19, 22 and the supporting portions 30, 40 integrated in the guide rails 15, 16, 45 and arranged in the corresponding inner spaces 31, 46. These inner spaces 31, 46 are defined by the uprights 38, 47 of the guide rails 15, 16, 45 which simultaneously provide the necessary stiffness for the guide rails 15, 16, 45. The number of components required is substantially reduced, resulting in production and assembly being simplified whilst also greatly reducing the weight and size.

What is claimed is:

1. A device for guiding and sealing a moveable window, especially a side window of a motor vehicle, comprising at least one guide rail defining a channel having an inner space and having sealing elements extending from opposite sides of the channel for guiding lateral edges of the window and for sealing said window, the guide rail having a perforated supporting structure in the inner space and at least one driving means adapted to engage the perforated supporting structure in the inner space for moving said window.

2. The device as set fourth in claim 1, in which the driving means comprises an electric motor driving at least one driving element cooperating with said perforated supporting structure.

3. The device as set forth in claim 2, in which said perforated supporting structure comprises perforations in an upright of said guide rail which perforations are engaged by at least one driving element.

4. The device as set forth in claim 3, in which said upright is made of metal, more particularly of aluminum or of a plastics material.

5. The device as set forth in claim 3 in which said upright comprises a substantially U-shaped cross-section and defines said inner space of said guide rail.

6. The device as set forth in claim 3, in which said sealing elements are extruded on said upright.

7. The device as set forth in claim 2, in which said inner space of said guide rail is suitable to accommodate said driving element.

8. The device as set forth in claims 2, in which said inner space of said guide rail is suitable to accommodate said driving element and said electric motor.

9. The device as set forth in claim 2, in which each guided lateral edge of said moveable window is assigned at least one driving element.

10. The device as set forth in claim 9, in which each guided lateral edge is assigned an electric motor.

11. The device as set forth in claim 9, in which an electric motor is provided which acts on said driving elements at said guided lateral edges.

12. The device as set forth in claim 2, in which one guided lateral edge is assigned at least one driving element driven by an electric motor and the other guided lateral edge is assigned a supporting mount for support.

13. The device as set forth in claims 12, characterized in that said supporting mount is accommodated in said inner space of said guide rail.

14. The device as set forth in claim 2, in which said driving elements are arranged on said guided lateral edges of said window paired spaced away from each other in parallel, said window being arranged centered relative to said driving elements.

15. The device as set forth in claim 1, in which at least one driving element is secured to said window.

16. The device as set forth in claim 15, in which each electric motor acts via a self-locking gear more particularly a worm gear on said assigned driving element.

17. A device for guiding, sealing and moving a movable window having two opposing lateral edges, especially a side window of a motor vehicle comprising:

a) at least one guide rail receiving and guiding a lateral edge of the window, the guide rail having an upright which includes a substantially U-shaped cross-section that defines an inner space of said guide rail;

b) said upright having sealing elements which extend from opposing sides of said upright for sealing contacting with the window;

c) a supporting portion arranged in said inner space, said supporting portion having perforations; and d) a driving means including an electric motor and a driving element driven by said electric motor and said driving element being accommodated in said inner space and engaging said perforations for moving said window.

18. A device as in claim 17 wherein said electric motor and said driving element are both accommodated in said inner space.

* * * * *

UNITED STATES PATENT AND TRADEMARK OFFICE
CERTIFICATE OF CORRECTION

PATENT NO.    : 6,430,874 B1
DATED         : August 13, 2002
INVENTOR(S)   : Hans-Bernd Korte It is certified that error appears in the above-identified patent and that said Letters Patent is hereby corrected as shown below:

<u>Title page,</u>
Item [30], Foreign Application Priority Data, the correct serial number should read as -- 198 46 658.7 --

Signed and Sealed this

Fourth Day of February, 2003

JAMES E. ROGAN
*Director of the United States Patent and Trademark Office*